June 14, 1927.

W. L. MARDEN

WATER METER

Filed Oct. 28, 1924

1,632,554

INVENTOR
William L. Marden
BY
Redding, Greeley, O'Shea Campbell
ATTORNEYS

Patented June 14, 1927.

1,632,554

UNITED STATES PATENT OFFICE.

WILLIAM L. MARDEN, OF ELMHURST, NEW YORK, ASSIGNOR TO NEPTUNE METER COMPANY, OF NEW YORK, N. Y., A CORPORATION OF NEW JERSEY.

WATER METER.

Application filed October 28, 1924. Serial No. 746,278.

In the increasing use of oil enclosed gear trains for disc water meters, in which the gear train for the actuation of the registering devices from the nutating disc is separated from the disc chamber by a partition, it has been found, particularly in cold climates, that although the disc chamber may be drained, the liquid within the gear chamber, whether it be oil or water, which has worked into the gear chamber, is oftentimes retained in the gear chamber in such quantity that when frozen there is danger of injuring the gear train. The object of the invention is to permit the nutating movement of the disc to be resumed when water is admitted again to the disc chamber, without starting the movement of the gearing and therefore injuring the gearing through breakage of the gear teeth. The object is attained by mounting one gear of the gear train frictionally so that although such gear or shaft may rotate when the nutating movement of the disc begins, the remainder of the train shall be at rest if the free operation of the train should be prevented by ice or congealed lubricant.

The invention will be described hereinafter with reference to the accompanying drawing in which it is illustrated and in which—

Figure 1:
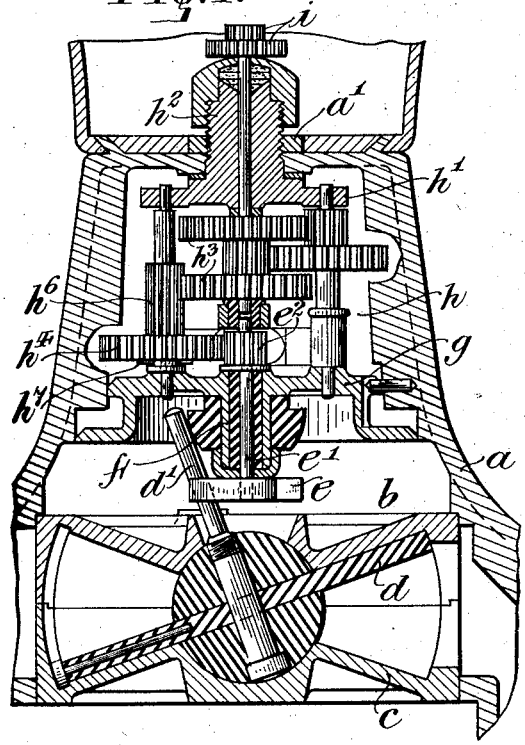
Figure 1 is a view in vertical sectional elevation of a disc meter with its gear train, the casing for the register and two of the gears of the register being also shown.
Figure 2:
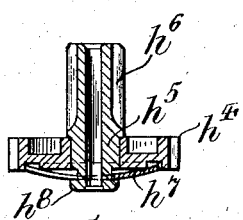
Figure 2 is a view in section showing the main driving gear mounted frictionally on its pinion.
Figure 3:
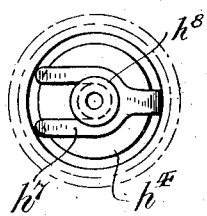
Figure 3 is a view of the parts shown in Figure 2, as seen from below.

The meter chosen for illustration of the application of the present improvements is of well known construction, comprising a casing $a$ in the lower part of chamber $b$ of which is mounted a disc chamber $c$ with its nutating disc $d$ and spindle $d'$. The latter engages the fingered disc $e$ on the lower end of a shaft $e'$ which is received in a suitable bearing $f$ supported by a horizontal plate or partition $g$ which, in meters of the particular type referred to, having an oil-enclosed gear train, forms a horizontal partition between the lower chamber $b$ and the gear chamber $h$. The partition or bottom plate $g$ of the gear chamber $h$ is received snugly within the main casing $a$ so as to retain oil within the gear chamber and particularly so as to prevent the wash of the oil in the gear chamber by currents of the water which flows through the lower part of the casing. In practice it is found that more or less water does in time work into the gear chamber and that although the lower part of the meter may be drained completely such water passes very slowly from the gear chamber and sometimes remains therein in such quantity as to cause damage to the gear train in freezing. The partition or bottom plate $g$ is supported by a gear frame $h'$, which itself is supported from the top of the casing $a$, as by a nut $a'$ which engages the threaded portion $h^2$ of the gear frame. The gear train, shown generally at $h^3$, may be of any usual or suitable construction, comprising a series of reduction gears through which the register mechanism, indicated sufficiently by the gears $i$, is driven from the shaft $e'$ to which motion is imparted from the nutating disc $d$. In the arrangement shown the shaft $e'$ carries, above the partition or bottom plate $g$, a driving pinion $e^2$ which meshes with the first or main driving gear $h^4$ of the gear train $h^3$. In accordance with the invention this first or main gear $h^4$ is mounted frictionally so that it may be rotated without actuating positively the remainder of the train. As shown, the gear $h^4$ is mounted frictionally on the sleeve shaft $h^5$ of the elongated pinion $h^6$ by which motion is transmitted to the remainder of the gear train. The gear $h^4$ is shown as held to the pinion $h^6$ by a slotted spring clip $h^7$ which engages the shouldered lower end of the pinion shaft and bears at its ends against the under side of the gear $h^4$. Should it happen, therefore, that the free operation of the gear train is prevented for any cause, as by ice between the teeth of the gears or by the congealing of the lubricant, the gear $h^4$ can be rotated by the action of the nutating disc and can be rotated upon the shaft of the pinion $h^6$ without causing breakage of the teeth of the gear train at any point.

Various other modifications of construction by which one of the gears of the train is frictionally engaged with the train will readily suggest themselves.

I claim as my invention:

In a water meter wherein, a partition divides the interior of a main casing, a gear train above the partition including a sleeve toothed at one end to form a pinion and shouldered to provide a seat at the other end, a gear mounted in the seat, a groove in the sleeve between the gear and its end, a yoke shaped spring member engaging the groove and bearing upon the gear at its extremities whereby a frictional connection is had between the two, and means for driving the gear.

This specification signed this 27th day of October, A. D. 1924.

WILLIAM L. MARDEN.